United States Patent
Boryca et al.

(10) Patent No.: US 7,119,306 B2
(45) Date of Patent: Oct. 10, 2006

(54) FOOD THAWING CABINET AND RELATED METHODS

(75) Inventors: Walter J. Boryca, Troy, OH (US); Jackson M. Miles, Jr., Weatherford, TX (US); Thomas Rands, Kansas City, MO (US)

(73) Assignee: Premark FEG L.L.C., Wilmington, DE (US)

( * ) Notice: Subject to any disclaimer, the term of this patent is extended or adjusted under 35 U.S.C. 154(b) by 0 days.

(21) Appl. No.: 10/752,374

(22) Filed: Jan. 6, 2004

(65) Prior Publication Data

US 2004/0139863 A1    Jul. 22, 2004

Related U.S. Application Data

(60) Provisional application No. 60/438,954, filed on Jan. 9, 2003.

(51) Int. Cl.
*F29B 29/00* (2006.01)
(52) U.S. Cl. ............... 219/385; 219/400; 219/413; 219/492; 219/494; 99/470; 165/254; 165/256; 165/261; 165/64

(58) Field of Classification Search ............... 219/385, 219/400, 413, 492, 494, 497; 99/468, 470; 426/524; 165/260–262, 254, 256, 61, 64
See application file for complete search history.

(56) References Cited

U.S. PATENT DOCUMENTS

| | | | | |
|---|---|---|---|---|
| 3,368,062 A | * | 2/1968 | Gramenius et al. | 219/400 |
| 3,501,620 A | * | 3/1970 | Sauer | 219/400 |
| 3,548,153 A | * | 12/1970 | Kells | 219/400 |
| 3,857,988 A | * | 12/1974 | Jensen et al. | 426/524 |
| 3,976,122 A | * | 8/1976 | Neidhardt | 165/61 |
| 4,812,622 A | * | 3/1989 | Takeda et al. | 219/400 |
| 4,870,254 A | * | 9/1989 | Arabori et al. | 219/400 |
| 4,898,741 A | * | 2/1990 | Heide | 426/524 |
| 4,913,223 A | * | 4/1990 | Mizuno et al. | 165/61 |
| 4,932,217 A | * | 6/1990 | Meyer | 219/492 |
| 5,089,679 A | * | 2/1992 | Eke | 219/400 |
| 5,326,578 A | * | 7/1994 | Yun | 426/524 |
| 5,442,994 A | | 8/1995 | Parker | |
| 6,316,749 B1 | * | 11/2001 | Bales et al. | 219/400 |
| 6,541,746 B1 | * | 4/2003 | Kim et al. | 219/400 |

* cited by examiner

Primary Examiner—Joseph Pelham
(74) Attorney, Agent, or Firm—Thompson Hine LLP (57) ABSTRACT

In one aspect, a food thawing cabinet includes at least one thawing chamber and one or more wall blowers and a heater for producing a controlled high volume of air flow over food product, with the heater controlled in a cyclic manner. In another aspect, various advanced control techniques for controlling heat input are provided in an effort to lower the time required to thaw frozen food products in a safe manner.

31 Claims, 10 Drawing Sheets

FOOD THAWING CABINET AND RELATED METHODS

CROSS-REFERENCE

This application claims the benefit of provisional application Ser. No. 60/438,954, filed Jan. 9, 2003, the entirety of which is incorporated herein by reference.

TECHNICAL FIELD

The present application relates generally to cabinets utilized for thawing frozen foods, and more particularly to a food thawing cabinet with an improved air flow system and heat control system for rapidly thawing frozen foods in a controlled, safe manner.

BACKGROUND

It is known to provide thawing cabinets for thawing frozen food products in commercial environments such as restaurants and cafeterias. Achieving high speed thawing while maintaining food safety is an important consideration.

SUMMARY

In one aspect, a food thawing cabinet includes at least one thawing chamber and one or more blowers and a heater for producing a controlled high volume of air flow over food products, with the heater controlled in a cyclic manner. High volume air flow and controlled heat input can effectively expedite the thawing process. In another aspect, various advanced control techniques for controlling heat input are provided in an effort to lower the time required to thaw frozen food products in a safe manner.

DETAILED DESCRIPTION

Referring to FIGS. 1–5, a thawing apparatus 10 includes a cabinet structure 12 including a thawing chamber 14 and a thawing chamber 16, with a mullion/center wall 18 separating the chambers. Two doors (not shown) may be provided on respective sides of the mullion 18 for providing access to the chambers 14 and 16. The mullion 18 includes a side 20 facing the thawing chamber 14, the side 20 having a plurality of air flow openings therein, including a set of air intake openings 22 for passing air from the thawing chamber 14 into an interior 24 of the mullion 18 and a set of air outlet openings 26 for passing air from the interior 24 of the mullion 18 to the chamber 14. An opposite side 28 of the mullion 18 faces the thawing chamber 16, the side 28 also having a plurality of air flow openings therein, including a set of air intake openings 30 for passing air from the thawing chamber 16 into the interior 24 of the mullion and a set of air outlet openings 32 for passing air from the interior 24 of the mullion to the thawing chamber 16. In the illustrated embodiment the air intake openings 22 and 30 on respective sides of the mullion 18 are positioned toward the rear part of the mullion 18 and are vertically distributed slots, and the air outlet openings 26 and 32 on respective sides of the mullion are smaller openings that are distributed both vertically and laterally over a remaining part of the respective mullion side.

Figure 1:
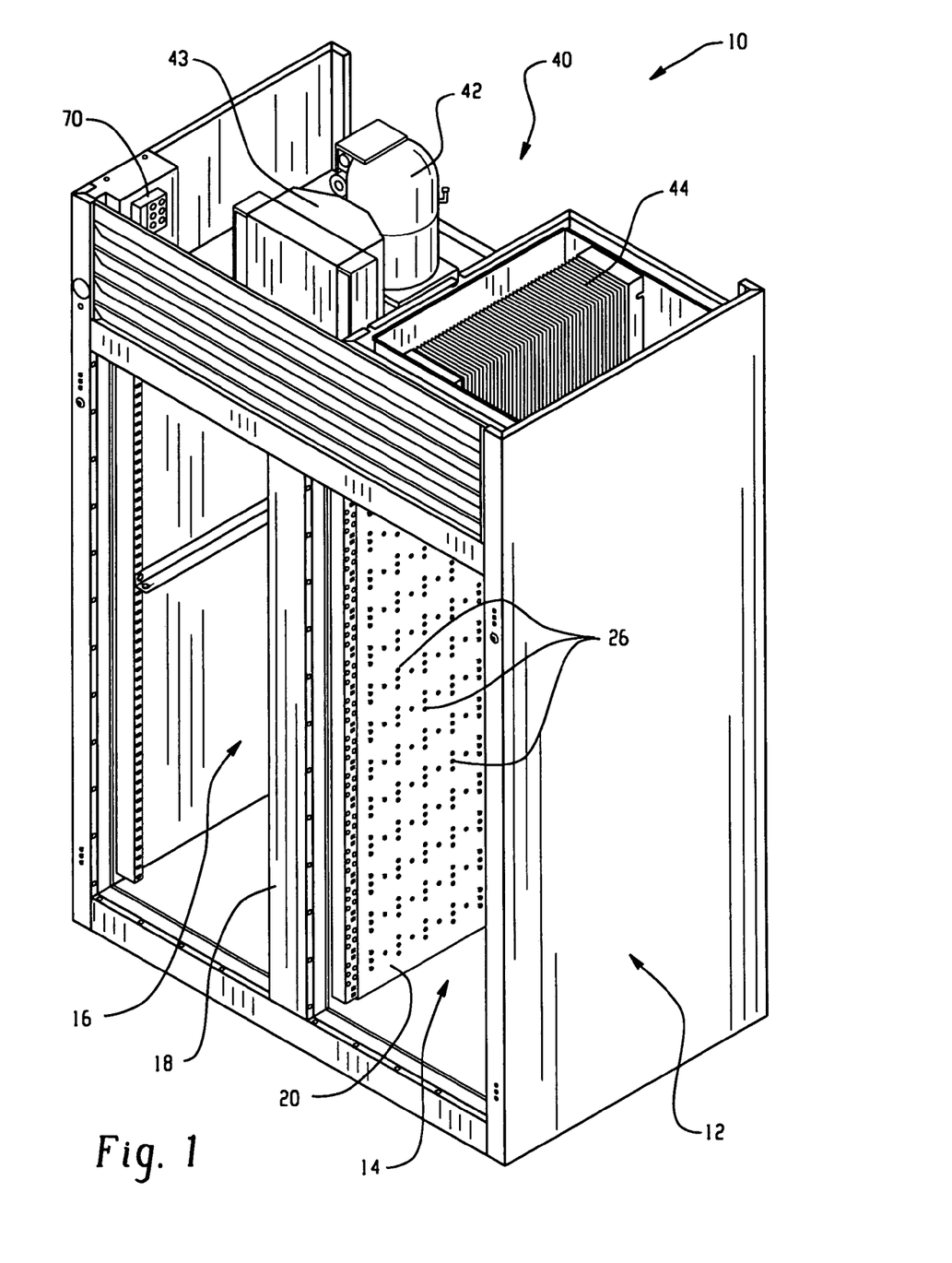
FIG. 1 is front, upper perspective of one embodiment of a thawing cabinet.
Figure 2:
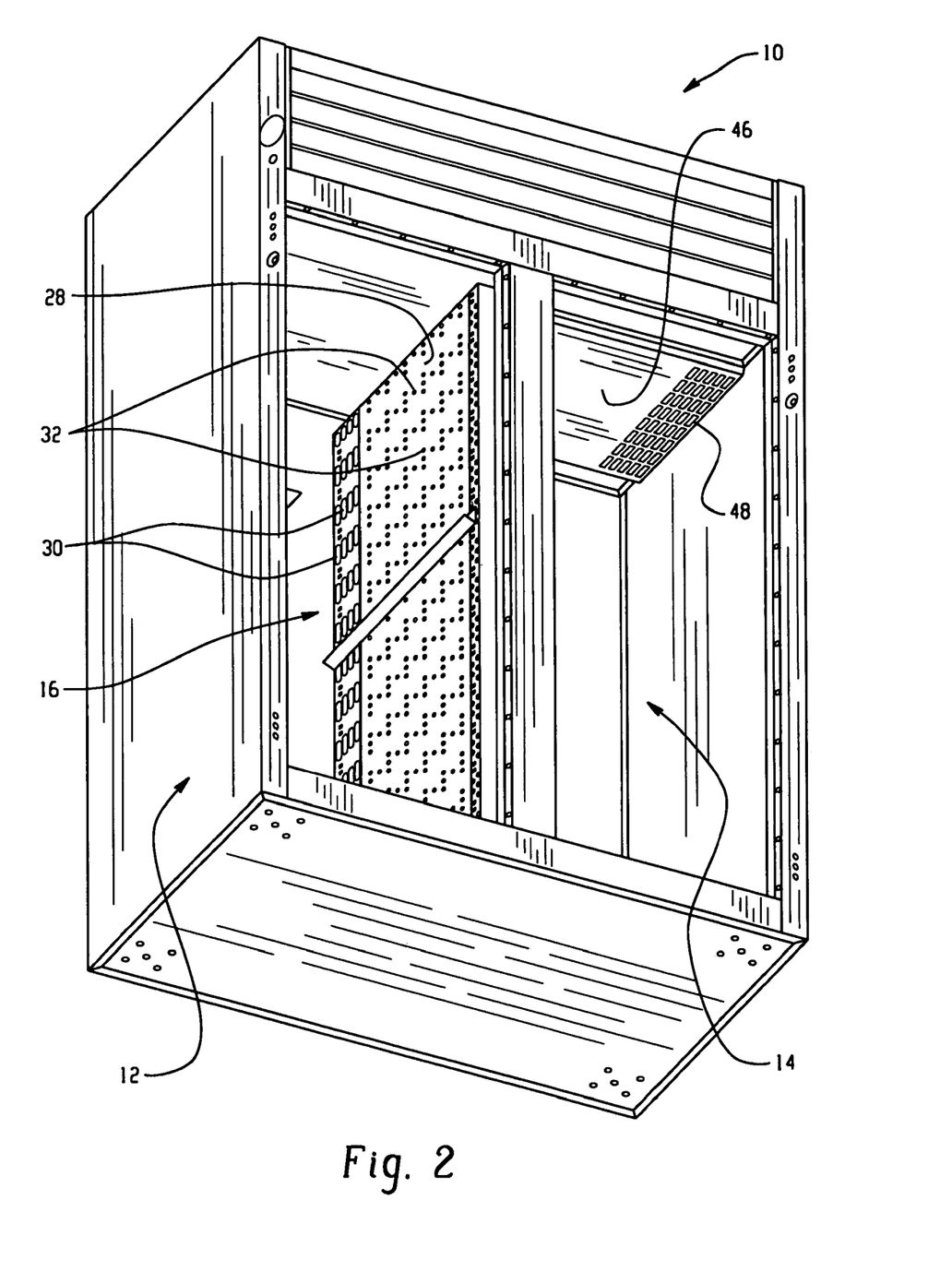
FIG. 2 is a front, lower perspective of the cabinet of FIG. 1.
Figure 3:
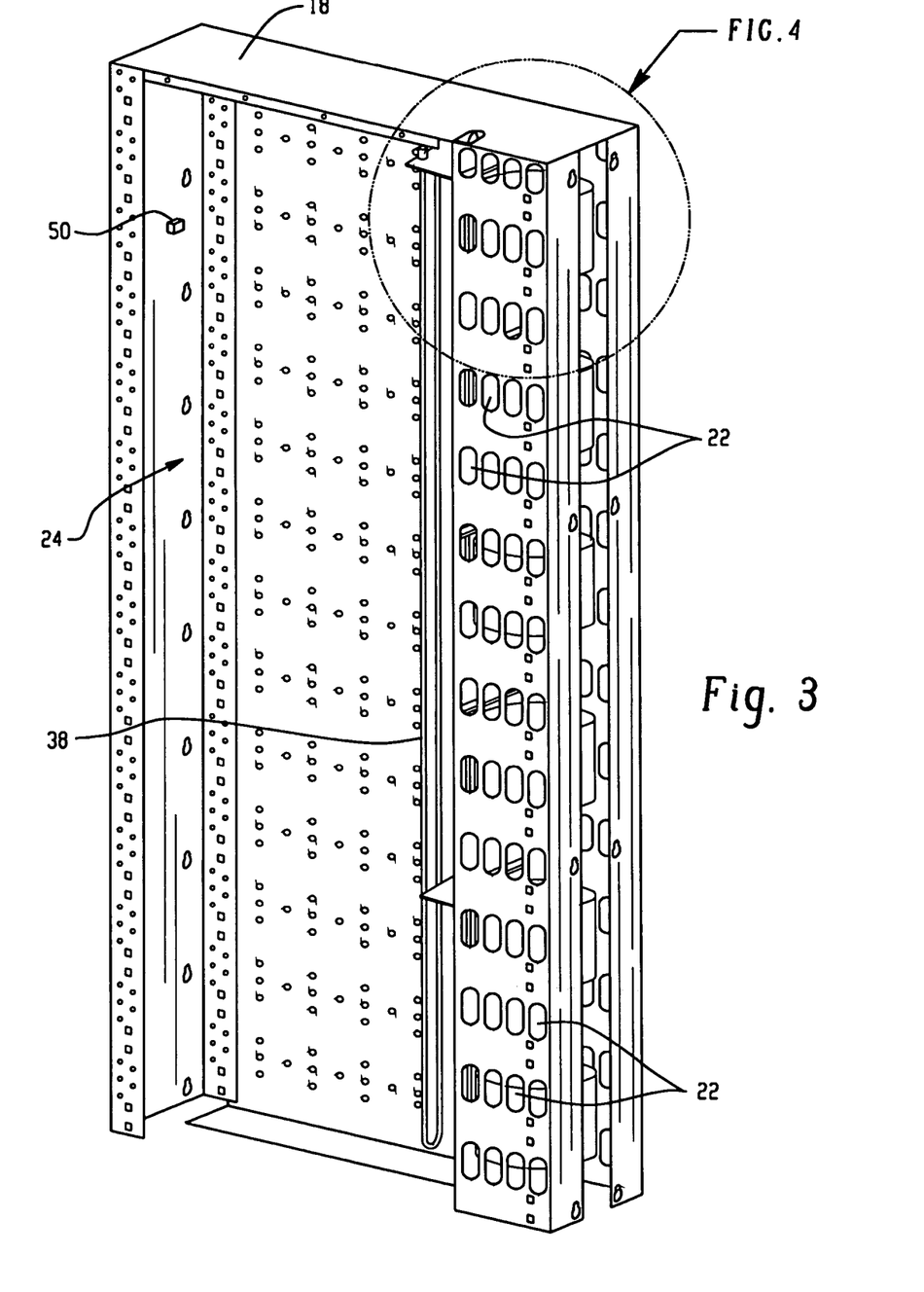
FIG. 3 is a perspective of a mullion part of the cabinet of FIG. 1.
Figure 4:
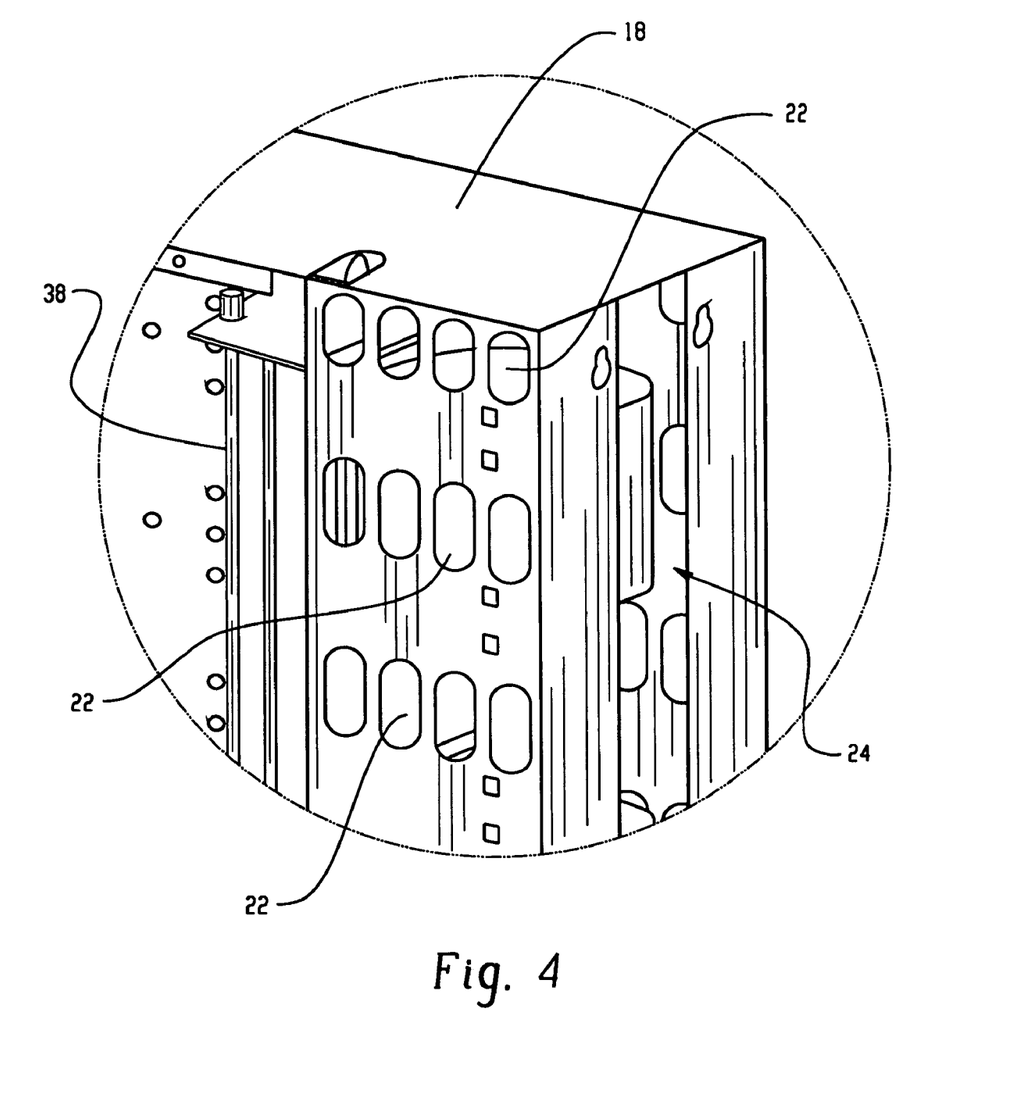
FIG. 4 is an enlarged view of a corner part of FIG. 3.
Figure 5:
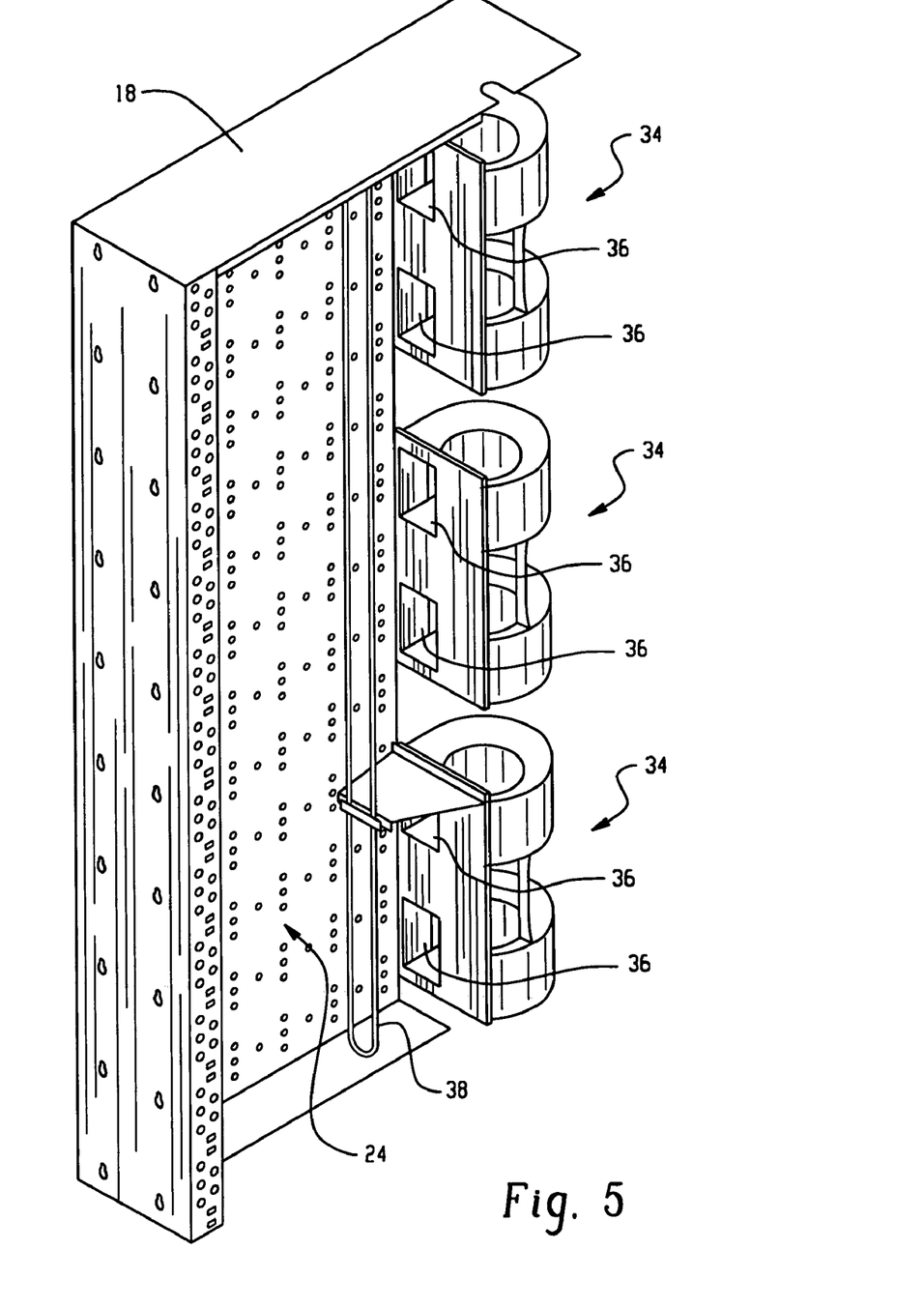
FIG. 5 is another perspective view of the mullion part.

A plurality of blowers 34 are associated with the mullion 18 for causing air flow into and out of the interior 24 of the mullion when operated. In the illustrated embodiment the blowers take the form of three vertically spaced dual squirrel cage blowers arrange in the interior 24 of the mullion, just inside of the inlet openings 22 and 30. The spaced apart squirrel cages of each blower 34 are driven by dual output shaft motors positioned between the cages. As best seen in FIG. 5, the illustrated blowers 34 include outlets 36 positioned to blow air through the remainder of the mullion interior 24. Although not shown, a vertical panel will be provided in the interior of the mullion to separate the input and output sides of the blowers to prevent a back draw from the downstream side of the blowers, with the panel having openings aligned with the outlets 36 of the blowers 34 to allow air to exit the blowers.

A heating element 38 is also associated with the mullion 18 for heating air prior to passing it from the interior 24 of the mullion into either of the thawing chambers 14 and 16. In the illustrated embodiment the heating element is a single, elongated and U-shaped resistive heating element that is positioned within the interior 24 of the mullion and proximate the outlets 36 of the blowers 34 to have the air from the blowers pass thereover.

The cabinet 10 also includes a top-mounted refrigeration system 40, including a compressor 42, a condenser coil 43, and an evaporator 44 with associated blower (not shown). The refrigeration system blower may be a squirrel cage blower. The evaporator section of the system is in flow communication with the chamber 14 via inlet openings (not shown ) in the top wall 46 of the chamber 14 beneath the evaporator 44 and outlet/return openings 48. An evaporator coil temperature sensor 51 (FIG. 6A) may also be provided as part of the refrigeration system.

A temperature sensor 50 may be provided in association with the mullion 18 for sensing a temperature of air delivered from the interior 24 of the mullion 18 to the thawing chambers 14 and 16. In the illustrated embodiment the sensor 50 is positioned within the interior 24 of the mullion 18 and is spaced apart from the heating element 38 so as to sense the overall temperature of the air within the mullion interior 24 as opposed to sensing the air temperature immediately coming off of the heating element 38.

When the blowers 34 are operated, they draw air in from the chambers 14 and 16 and deliver it past the heating element 38 to create a pressurized condition at the downstream side of the blowers 34. The pressurized condition causes substantially uniform air flow through the outlet openings 26 and 32 into respective chambers 14 and 16.

Figure 6A:
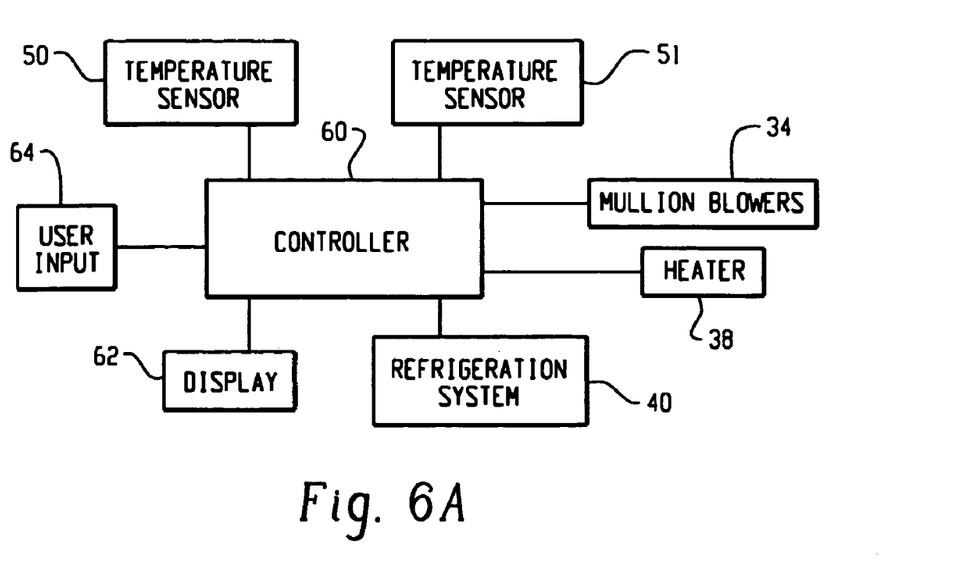
FIGS. 6A and 6B are control drawings.
Figure 6B:
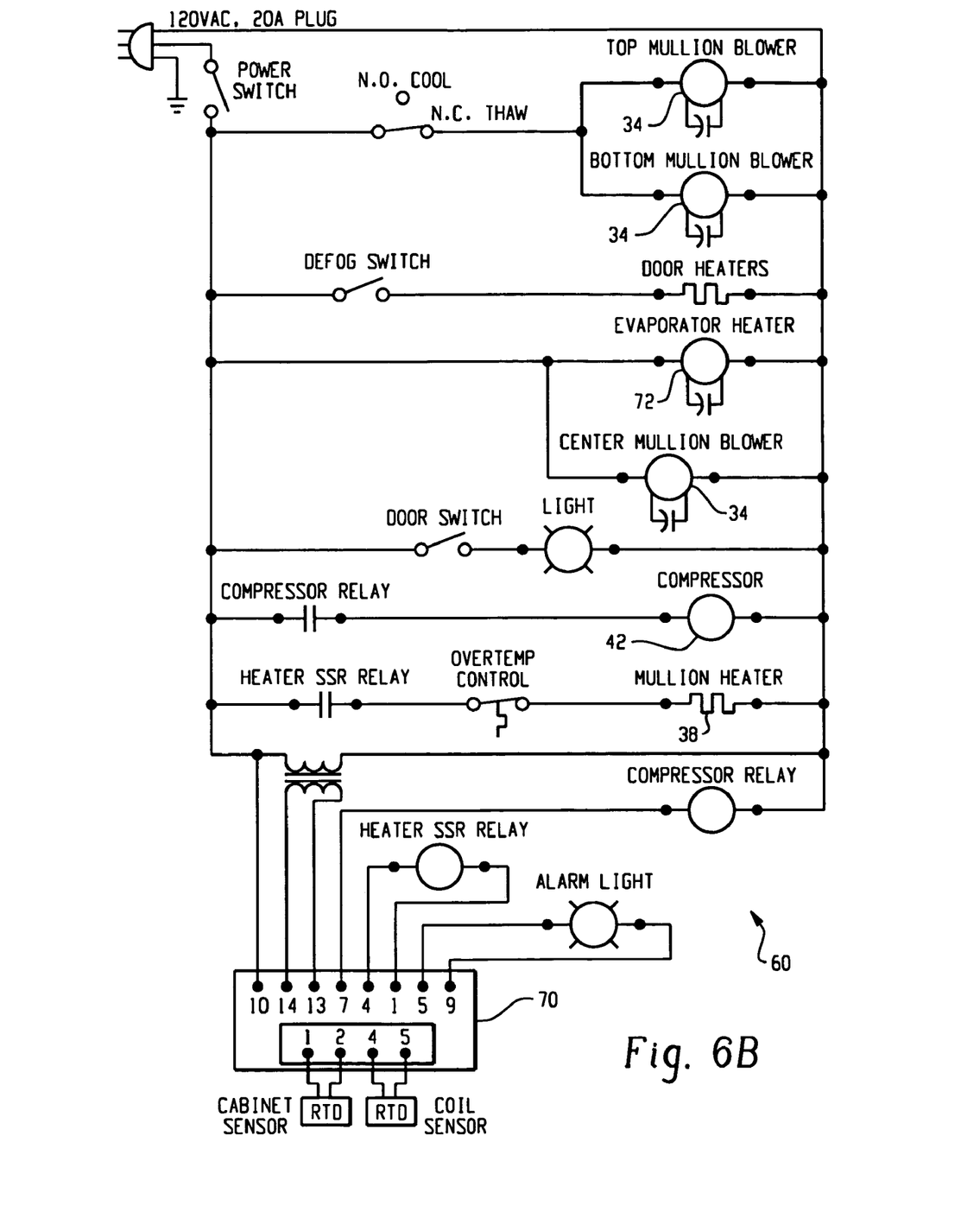

An exemplary control system is shown in FIG. 6A. A controller 60 is connected to receive inputs from both temperature sensors 50 and 51 and is also connected to control the operation of the mullion blowers 34, the heating element 38 and the refrigeration system 40, including its blower. The controller 60 may receive input from any suitable user input device or devices 64, such as switches, input keys or input knobs. The controller 60 may also effect display of information to an operator via one or more displays 62. A more detailed schematic of one embodiment of a controller 60 in association with various cabinet components is shown in FIG. 6B, the controller 60 being comprised of a logic/processing unit 70 in combination with the various relays, contacts and switches shown. The evaporator blower 72 is also shown.

Figure 7A:
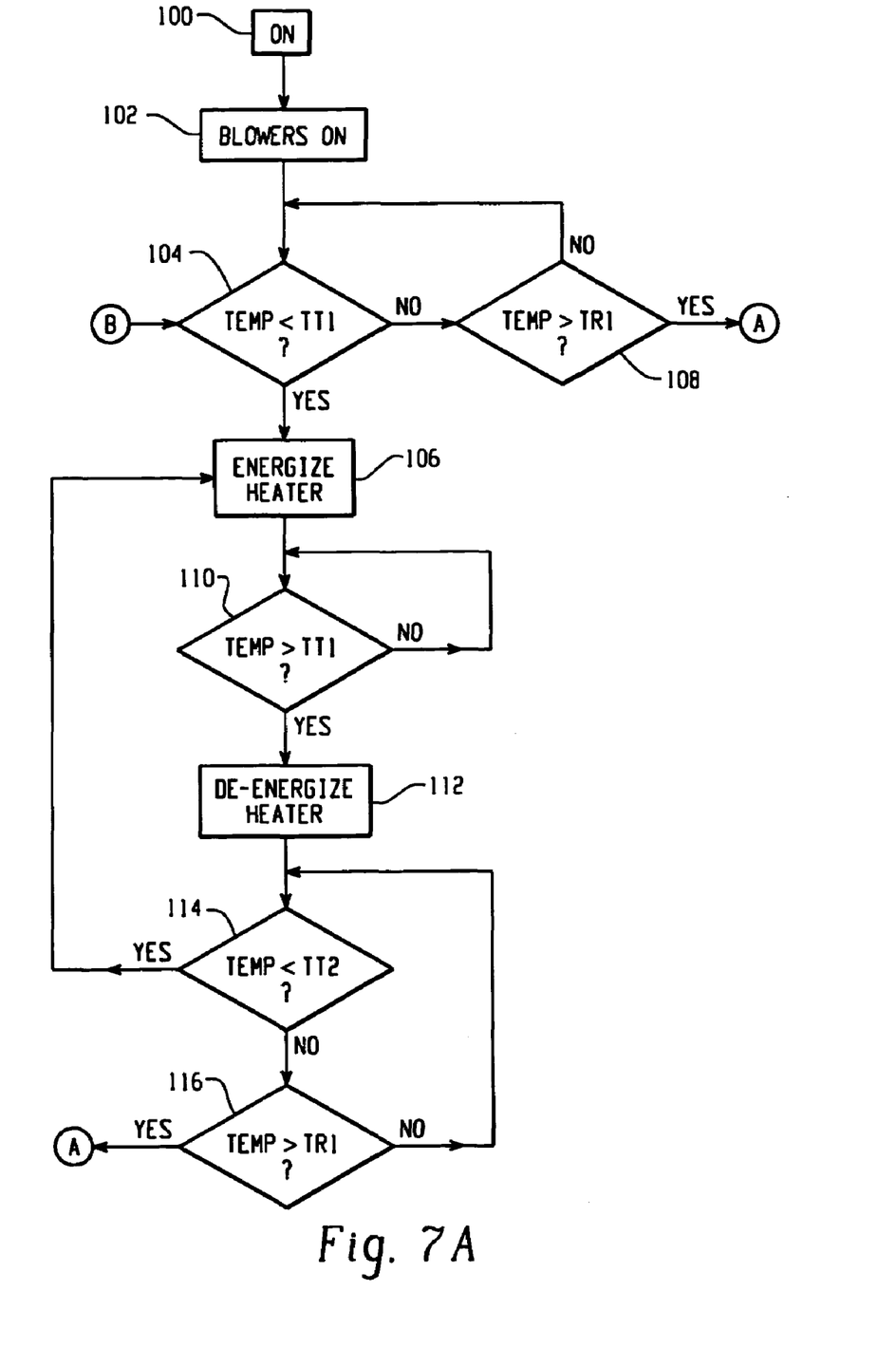
FIG. 7A is a flow chart of one embodiment of a thawing operation.
Figure 7B:
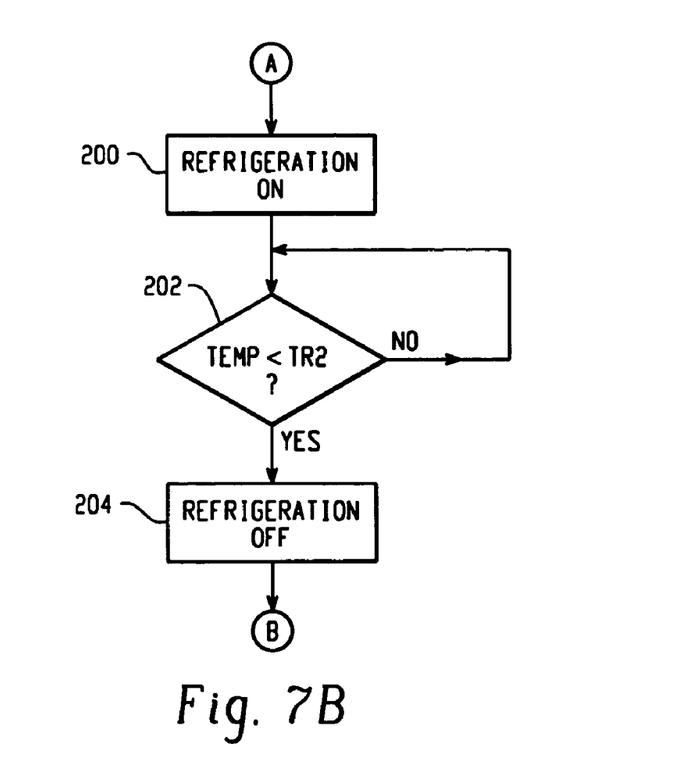
FIG. 7B is a flow chart of a standard refrigeration cycle.

One embodiment of high-level system operation is described with reference to the flow charts shown in FIGS. 7A and 7B. When the unit is turned ON as indicated at 100, the controller turns on the blowers at 102. Typically this step would involve operation of both the mullion blowers 34 and the refrigeration system blower, but variations are possible, such as operation of only the mullion blowers 34 or operation of only certain (e.g., less than all) of the mullion blowers 34. At step 104, if the temperature sensed by the mullion temperature sensor 50 is less than a thawing set point TT1, a thawing operation is initiated at step 106. Otherwise at step 108 the temperature is checked to see if it is above a set point TR1 for initiating a refrigeration operation as per the flow chart of FIG. 7B. In one embodiment, step 108 may be carried out using the evaporator coil temperature sensor 51. However, it is also recognized that the mullion temperature sensor 50 could be used. Steps 104 and 106 are repeated until one of a thawing operation or a refrigeration operation is initiated.

The thawing operation begins with energization of the heating element 38 at step 106. Next, the mullion temperature sensor 50 is monitored at step 110 until the temperature rises above the thawing set point TT1, at which point the heater is de-energized at step 112. At step 114 the mullion temperature sensor 50 is checked to determine if the temperature is below a thawing set point TT2, which is less than TT1. If so, operation returns to step 106. If not, at step 116 the temperature is checked against refrigeration set point TR1 to determine whether to initiate a refrigeration operation. Thus, during a thaw cycle the blowers are typically maintained ON and the heating element is cyclically turned ON (e.g., energized and OFF (e.g., de-energized) according to the sensed temperature set points TT1 and TT2. In one embodiment, TT1 is between 35° F. and 39° F. and TT2 is about 1° F. to 3° F. less than TT1. in a more specific example TT1 is about 37° F. and TT2 is about 36° F.

Subsequent to an affirmative determination at step 108 of FIG. 7A, the refrigeration system is turned on at step 200, per FIG. 7B, and at step 202 the temperature is monitored to see when it falls below a refrigeration set point TR2, which is lower than set point TR1. When the temperature falls below the set point TR2, the refrigeration system is turned OFF at step 204 and processing returns to step 104 in FIG. 7A. In one embodiment, mullion temperature sensor 50 is monitored for the purpose of step 202. In one implementation, the temperature set point TR2 is about 38° F. and the temperature set point TR1 is about 40° F., but variations are possible.

In one embodiment it is contemplated that all mullion blowers 34, as well as the refrigeration system blower, will be operated during all steps of both refrigeration operations as well as thawing operations, as well as during transition from one operation to another. However, it is recognized that the operation of the blower motors themselves also contributes to the heat input of the cabinet. Accordingly, in certain embodiments it may be advantageous to only energize a limited number of the blowers (e.g., turn OFF one or more mullion blowers and/or turn OFF the refrigeration system blower). For example, as the food product approaches a thawed state during repeated thawing cycles, one or more of the mullion blowers 34 and/or the refrigeration system blower could be turned OFF at the same time the heating element is de-energized at step 112 (FIG. 7A) in order to further reduce the heat input to the system. Such a partial shut down of blower operation could be activated by tracking the change in time period between an affirmative (YES) answer at step 110 and an affirmative answer at step 114, which represents a temperature change rate within the system. As the food product thaws, this time period will get longer and longer. The controller may be set to initiate the partial blower shut down when the time period exceeds a certain set time period. This operation results in a method for thawing frozen food product using a cabinet with at least one thawing chamber holding the food product, the cabinet including a heating element, a plurality of blowers and a temperature sensor, where the method involves: during initial cycles of the thawing operation operating all blowers; subsequent to the initial cycles, and as a cold load produced by the food product decreases, turning at least one blower OFF to reduce heat input from operation of blower motors, while maintaining at least one blower ON. In another example, it may be desirable to operate less than all mullion blowers 34 during refrigeration cycles in order to reduce heat input, increasing the ability of the thawing apparatus to reduce the temperature of warm or hot food products added to one of the chambers 14 or 16 and also decreasing the energy consumption of the unit.

In another embodiment of a thawing operation described with reference to the flow chart of FIG. 7A, steps 120, 122, 124 and 128 correspond to steps 100, 102, 104 and 108 respectively of FIG. 8. However, given an affirmative decision at step 124, a variation in the manner in which the heating element 38 is energized is provided. In particular, at step 126 the temperature is examined to determine if it is below set point TT2, which is lower than set point TT1. If so, the heating element is energized at a first power level at step 130. On the other hand, a negative decision at step 126 results in energization of the heating element at a second power level at step 132, with the second power level being less than the first power level. In the illustrated embodiment the first power level is a full (100%) power level and the second power level is a 50% power level. In one embodiment, such energization control of the heating element can achieved by varying the duty cycle of a PWM (pulse width modulated) signal used to control current delivered to the heating element. Subsequent to step 130, at step 134 the temperature is monitored to determine if it rises above set point TT2. If so, the energization of the heating element is reduced at step 132. Subsequent to step 132, at step 136 the temperature is monitored to determine if falls back below temperature set point TT2. If so, the heater is again energized at the higher power level per step 130. If not, the temperature is checked at step 138 to determine if the temperature increases above the set point TT1, at which point the heater is de-energized at step 140. Steps 142 and 144 correspond to steps 114 and 116 respectively of FIG. 7A.

Figure 8:
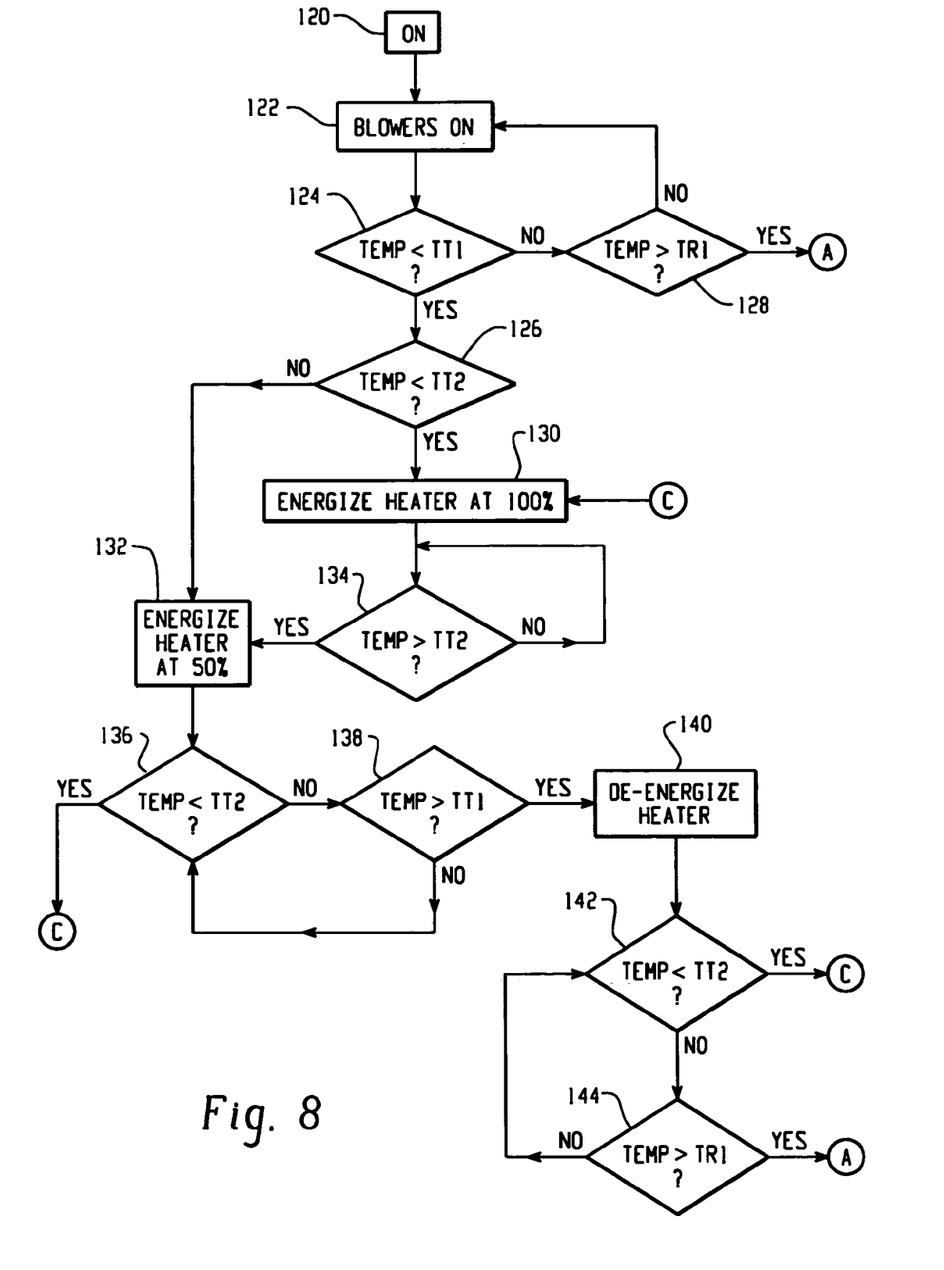
FIG. 8 is a flow chart of another embodiment of a thawing operation.

The thawing operation of FIG. 8 results in a method for controlling heat input to a thawing cabinet during a thawing operation using a cabinet with at least one thawing chamber holding food product, the cabinet including a heating element, at least one blower and a temperature sensor, the method involving the steps of: selectively energizing and de-energizing the heating element in accordance with a first temperature set point (e.g., TT1); wherein current is delivered to the heating element to produce a first power level when the temperature is below a second temperature set point (e.g., TT2) that is below the first temperature set point; wherein current is delivered to the heating element to produce a second power level when the temperature is above the second temperature set point, where the second power level is less than the first power level; wherein the heating element is de-energized when the temperature exceeds the first temperature set point. This operation advantageously reduces the heat input to the system as the temperature during the thawing cycle approaches the set point TT1.

In the illustrated embodiment of FIG. 8, two possible power levels for the heating element are utilized. However, it is recognized that more than two such power levels could be used, each initiated at its own temperature set point. Further, in another example the staged energy reduction of the heating element as the temperature approaches the set point TT1 could be achieved utilizing the proportional part of a PID controller. Specifically, where the set point TT1 is 37° F. and the proportional band is set at 1° F., the 50% power reduction is achieved when the temperature reaches 36° F. Where the set point TT1 is 37° F. and the proportional band is set at 2° F., a 33% power reduction, relative to full power, would be implemented when the temperature reaches 35° F. and a 66% power reduction, relative to full power, would be implemented when the temperature reaches 36° F.

In still another embodiment of a thawing operation described with reference to FIG. 9, steps 150, 152, 154 and 158 correspond to steps 100, 102, 104 and 108 respectively of FIG. 7A. It is assumed that at step 154 temperature set point TT1 is at a first level, for example, 37° F., and it is assumed that at step 158 temperature set point TR1 is set at a first level, such as 40° F. Given an affirmative decision at step 154, and a decision at step 156 that a thaw cycle has just started, a variation in the initial temperature set point TT1 is made. In particular, at step 160 temperature set point TT1 is set to a higher level, in this example 45° F., and temperature set point TR1 is set to a higher level, in this example 48° F. The heating element is energized at step 162 until the temperature exceeds set point TT1. At step 166 a count NT of thaw cycles is incremented and at step 168, if the thaw cycle count has reached a certain count, NTMAX, at step 170 the set point TT1 is set back to the lower level (e.g., 37° F.) and the temperature set point TR1 is set back to its lower level (e.g., 40° F.). Steps 172, 174 and 176 correspond to steps 112, 114 and 116 respectively of FIG. 7A. An additional step 178 is provided before entering a refrigeration cycle to be sure that the temperature set point TR1 is set back to an appropriate level for normal refrigeration. During initial thawing cycles (e.g., up to NTMAX) refrigeration is initiated if the temperature exceeds the higher set point TR1 as defined step 160, and during subsequent thawing cycles refrigeration is initiated if the temperature exceeds the lower set point TR1 as defined at step 170.

Figure 9:
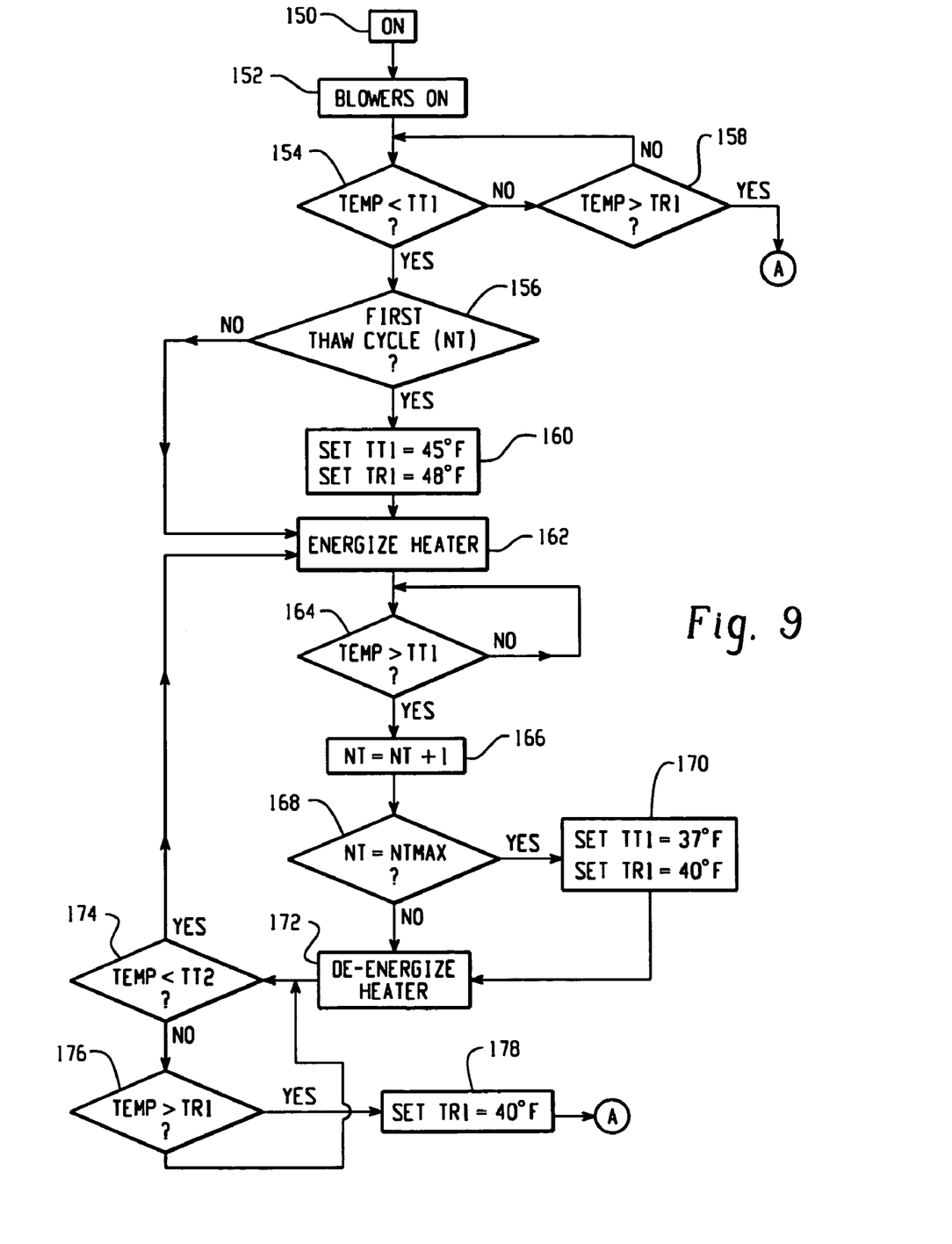
FIG. 9 is a flow chart of another embodiment of a thawing operation.

The thawing operation of FIG. 9 provides a thawing method in which, during one or more initial cycles the heating element is (i) energized when the temperature indicated by the temperature sensor is below a first set point, (ii) de-energized when the temperature indicated by the temperature sensor reaches the first set point and (iii) energized when the temperature indicated by the temperature sensor fall back below the first set point by a certain amount; and subsequent to the one or more initial cycles the heating element is (i) energized when the temperature indicated by the temperature sensor is below a second set point, (ii) de-energized when the temperature indicated by the temperature sensor reaches the second set point and (iii) energized when the temperature indicated by the temperature sensor falls back below the second set point by a certain amount; wherein the first set point is a higher temperature than the second set point. This type of operation facilitates a faster thawing time by adding more heat to the system during initial thaw cycles, when the cold load of the frozen food product is greatest and can more quickly bring the air temperature within the thawing chamber back down below a normally accepted level, such as 40° F. In the illustrated embodiment the higher TR1 temperature set point is used for a specified number of cycles as set by NTMAX, but it is recognized that other techniques to transition from the higher TR1 set point back to the lower TR1 set point could be used, such as monitoring a change in the time period taken between an affirmative decision at step 164 and an affirmative decision at step 174, which represents a temperature change rate taking place in the system.

It is also contemplated that various combinations of the above-described embodiments of thawing operations could be provided. For example, in the embodiment of FIG. 8 a step could be added to also shut down one or more blowers at desired times to reduce heat input from the blower motors. In another example, the embodiments of FIGS. 8 and 9 could be combined to provide for both a staged energization reduction of the heating element and a higher TR1 set point for one or more initial thawing cycles.

In one embodiment, the a full power level of the heating element 38 is about 1300 watts, each mullion blower 34 can move air at a rate of 125 ft$^3$/min and adds heat to the system at a rate of about 35 watts when running, the evaporator blower can move air through the evaporator at a rate of about 325 ft$^3$/min and adds heat to the system at a rate of about 125 watts when running, and a total thawing chamber volume is between about 40 ft$^3$ and 50 ft$^3$. Of course, these specifications are exemplary only and variations are possible, such as a higher power heating element and/or more or less fans with higher or lesser air flow. However, as a general rule a high volume of air flow is desirable for better thawing, and in one embodiment the mullion blowers are sized and operated to move a volume of air corresponding to a total thawing chamber volume every 5 to 10 seconds. In another embodiment, the combined operation of the mullion blowers and the refrigeration system blower moves a volume of air corresponding to a total thawing chamber volume every 2 to 6 seconds.

It is to be clearly understood that the above description is intended by way of illustration and example only and is not intended to be taken by way of limitation. For example, while a two chamber unit is primarily described, single chamber thawing units are possible and thawing units with more than two chambers are also possible. Other changes and modifications could be made, including both narrowing and broadening variations and modifications of the appended claims.

What is claimed is:

1. A food thawing apparatus, comprising:
   a cabinet structure including a first thawing chamber and a second thawing chamber, a mullion separating the first thawing chamber from the second thawing chamber;
   the mullion including a first side facing the first thawing chamber, the first side having a plurality of air flow openings therein, including a set of air intake openings for passing air from the first thawing chamber into an interior of the mullion and a set of air outlet openings for passing air from the interior of the mullion to the first thawing chamber;

the mullion including a second side facing the second thawing chamber, the second side having a plurality of air flow openings therein, including a set of air intake openings for passing air from the second thawing chamber into the interior of the mullion and a set of air outlet openings for passing air from the interior of the mullion to the second thawing chamber;

a plurality of blowers associated with the mullion for causing air flow into and out of the interior of the mullion when operated; and at least one heating element associated with the mullion for heating air prior to passing it from the interior of the mullion into either of the first and second thawing chambers;

wherein the set of air outlet openings on the first side of the mullion includes multiple air outlet openings distributed substantially along a height of the mullion and downstream of the heating element, and the set of air outlet openings on the second side of the mullion includes multiple air outlet openings distributed substantially along the height of the mullion and downstream of the heating element;

wherein the plurality of blowers are capable of generating a pressurized condition within a common interior chamber of the mullion by directing air from the plurality of blowers into the common interior chamber, the heated, pressurized air passing from the common interior chamber through the multiple air outlet openings associated with at least one of the first and second sides.

2. The apparatus of claim 1, further comprising:
a refrigeration system associated with the cabinet structure.

3. The apparatus of claim 1, further comprising:
a temperature sensor associated with the mullion for sensing a temperature of air delivered from the interior of the mullion to the first and second thawing chambers.

4. The apparatus of claim 3, further comprising:
a controller connected to control the blowers and the heating element, the controller receiving an input from the temperature sensor, the controller operable during a food thawing operation to:
(i) operate the blowers to produce an air flow through both the first and second thawing chambers and the interior of the mullion; and
(ii) selectively energize the heating element based upon the input received from the temperature sensor.

5. The apparatus of claim 4 wherein during the food thawing operation the controller:
energizes the heating element when a temperature indicated by the temperature sensor is below a set point between 35° F. and 39° F., stops energizing the heating element when the temperature indicated by the temperature sensor reaches the set point, and subsequently starts energizing the heating element if the temperature indicated by the temperature sensor falls below the set point by a certain amount.

6. The apparatus of claim 5, wherein the set point is between 36° F. and 38° F. and the certain amount is at least ½° F.

7. The apparatus of claim 4 wherein the mullion blowers are sized and operated to move a volume of air corresponding to a total thawing chamber volume every 5 to 10 seconds.

8. The apparatus of claim 4, further comprising:
a refrigeration system associated with the cabinet and including at least one blower and a corresponding air flow path associated with at least one of the first and second thawing chambers, the controller connected to control the refrigeration system;
wherein during the food thawing operation the controller maintains the refrigeration system in an OFF condition, and operates the refrigeration system blower to increase air flow.

9. The apparatus of claim 8 wherein combined operation of the mullion blowers and the refrigeration system blower moves a volume of air corresponding to a total thawing chamber volume every 2 to 6 seconds.

10. The apparatus of claim 3 wherein the heating element is located adjacent an output side of at least one of the blowers and the temperature sensor is positioned within the interior of the mullion and spaced apart from the heating element.

11. The apparatus of claim 1 wherein air from the first and second thawing chambers mixes in the interior of the mullion.

12. The food thawing apparatus of claim 1, wherein the air flow openings of at least one of the first and second sides are sized and arranged to restrict passage of air from the mullion to generate a pressurized condition within the mullion during operation.

13. A food thawing apparatus, comprising:
a cabinet structure including a thawing chamber having a wall and an air flow path pennitting air to pass from the thawing chamber into an interior of the wall and out of the interior of the wall back to the thawing chamber;
multiple blowers associated with the wall that direct air flow into and out of a common interior chamber of the wall when operated; and
at least one heating element positioned for heating air prior to passing it from the common interior chamber of the wall back to the thawing chamber;
wherein the air flow path is sized and configured to restrict passage of air from the common interior chamber of the wall to generate a higher pressure condition within the common interior chamber of the wall such that air flows from the higher pressure condition within the wall to a lower pressure condition in the thawing chamber;
wherein the air flow path includes multiple air outlet openings in the wall for delivering air pressurized by the multiple blowers from the common interior chamber of the wall to the thawing chamber, the multiple air outlet openings distributed substantially along a height of the wall and downstream of the heating element.

14. A food thawing apparatus, comprising:
a cabinet structure including a thawing chamber having a wall and an air flow path permitting air to pass from the thawing chamber into an interior of the wall and out of the interior of the wall back to the thawing chamber;
at least one blower associated with the wall for causing air flow into and out of the interior of the wall when operated;
at least one heating element positioned for heating air prior to passing it from the interior of the wall back to the thawing chamber;

a temperature sensor positioned to sense a temperature of air delivered from the interior of the wall to the thawing chamber;

a refrigeration system associated with the cabinet and including at least one blower and a corresponding air flow path associated with the thawing chamber;

a controller connected to control the wall blower, the heating element and the refrigeration system, the controller receiving an input from the temperature sensor, the controller operable during a thawing operation to:
(i) operate the wall blower;
(ii) maintain the refrigeration system in an OFF condition;
(iii) cyclically energize and de-energize the heating element based upon the input received from the temperature sensor as follows:
  (a) energize heating element when a temperature indicated by the temperature sensor is below a first set point;
  (b) de-energize the heating element when the temperature indicated by the temperature sensor reaches the set point; and
  (c) subsequent to (b), energize the heating element if the temperature indicated by the temperature sensor falls below the set point by a certain amount;
the controller operable upon completion of the thawing operation to operate the refrigeration system in a cyclic manner to cycle a temperature within the thawing chamber between a second set point and a third set point, both of which are higher than the first set point, the second set point lower than the third set point.

15. The apparatus of claim 14 wherein the first set point is no more than 2° F. below the second set point.

16. The apparatus of claim 14 wherein first set point is between 36° F. and 38° F., the second set point is between 37° F. and 39° F.

17. The apparatus of claim 14 wherein during the thawing operation the refrigeration system blower is also operated.

18. A food thawing apparatus, comprising:
a cabinet structure including a thawing chamber having a wall and an air flow path permitting air to pass from the thawing chamber into an interior of the wall and out of the interior of the wall back to the thawing chamber;
at least one blower associated with the wall for causing air flow into and out of the interior of the wall when operated;
at least one heating element positioned for heating air prior to passing it from the interior of the wall back to the thawing chamber;
a plurality of blowers associated with the wall for causing air flow into and out of the interior of the wall when operated;
a temperature sensor positioned to sense a temperature of air delivered from the interior of the wall to the thawing chamber;
a controller connected to control the blowers and the heating element and to receive input from the temperature sensor, wherein the controller has a thawing operation mode in which it controls the heating element and blowers to:
during initial cycles of the thawing operation operate all blowers and selectively energizing the heating element;
subsequent to the initial cycles, and as a cold load produced by the food product decreases, turn at least one blower OFF to reduce heat input from operation of blower motors, while maintaining at least one blower ON.

19. A method for thawing frozen food product using a cabinet with at least one thawing chamber holding the food product, a heating element, one or more blowers and a temperature sensor, the method comprising the steps of:
operating the blower to produce high volume air flow through the thawing chamber;
repeatedly energizing and de-energizing the heating element ON and OFF according to a temperature indicated by the temperature sensor;
wherein during one or more initial cycles of a thawing operation the heating element is (i) energized when the temperature indicated by the temperature sensor is below a first set point, (ii) de-energized when the temperature indicated by the temperature sensor reaches the first set point and (iii) energized when the temperature indicated by the temperature sensor fall back below the first set point by a certain amount; and
subsequent to the one or more initial cycles the heating element is (i) energized when the temperature indicated by the temperature sensor is below a second set point, (ii) de-energized when the temperature indicated by the temperature sensor reaches the second set point and (iii) energized when the temperature indicated by the temperature sensor fall back below the second set point by a certain amount;
wherein the first set point is a higher temperature than the second set point.

20. The method of claim 19, wherein the first set point is above 40° F. and the second set point is below 40° F.

21. The method of claim 20 wherein the first set point is between 42° F. and 48° F. and the second set point is between 35° F. and 39° F.

22. A method for thawing frozen food product using a cabinet with at least one thawing chamber holding the food product, the cabinet including a heating element, one or more blowers, a refrigeration system and a temperature sensor, the method comprising the steps of:
operating the blower to produce high volume air flow through the thawing chamber;
while the refrigeration system is maintained OFF, repeatedly cycling energizing and de-energizing the heating element according to a temperature indicated by the temperature sensor, wherein multiple cycles of a thawing operation the heating element is (i) energized when the temperature indicated by the temperature sensor is below a first set point, (ii) de-energized when the temperature indicated by the temperature sensor reaches the first set point and (iii) re-energized when the temperature indicated by the temperature sensor falls back below the first set point by a certain amount; and
when the temperature indicated by the temperature sensor reaches a second set point, above the first set point, the refrigeration system is operated in a cyclic manner to cycle a temperature within the thawing chamber between a third set point and the second set point, the third set point between the first set point and the second set point, the third set point no more than 2° F. above the first set point.

23. A method for thawing frozen food product using a cabinet with at least one thawing chamber holding food product, the cabinet including a heating element, at least one blower and a temperature sensor, the method comprising the steps of:
selectively energizing and de-energizing the heating element in accordance with a first temperature set point;

wherein current is delivered to the heating element to produce a first power level when the temperature is below a second temperature that is below the first temperature set point;

wherein current is delivered to the heating element to produce a second power level when the temperature is above the second temperature, the second power level is less than the first power level;

wherein the heating element is de-energized when the temperature exceeds the first temperature set point.

24. The method of claim 23 wherein subsequent to de-energizing the heating element, the heating element is again energized when the temperature falls below a third temperature that is less than the second temperature.

25. The method of claim 23 wherein the cabinet includes a mullion separating a first thawing chamber and a second thawing chamber, the heating element is positioned within the mullion, at least one mullion blower is located for causing air flow into and out of the interior of the mullion when operated, the cabinet further includes a refrigeration system with an associated blower, during at least portions of the thawing operation both the mullion blower and the refrigeration system blower are operated.

26. The method of claim 25 wherein a volume of the first thawing chamber and a volume of the second thawing chamber together form a total thawing chamber volume, and the mullion blower and the refrigeration system blower are operated to move a volume of air corresponding to the total thawing chamber volume every 2 to 6 seconds.

27. The method of claim 23 wherein the cabinet includes a mullion separating a first thawing chamber and a second thawing chamber, the heating element is positioned within the mullion, a plurality of mullion blowers are located for causing air flow into and out of the interior of the mullion when operated, a volume of the first thawing chamber and a volume of the second thawing chamber together form a total thawing chamber volume, and the mullion blowers are operated to move a volume of air corresponding to the total thawing chamber volume every 5 to 10 seconds.

28. A food thawing apparatus, comprising:
 a cabinet structure including a thawing chamber having a wall and an air flow path permitting air to pass from the thawing chamber into an interior of the wall and out of the interior of the wall back to the thawing chamber;
 at least one blower associated with the wall for causing air flow into and out of the interior of the wall when operated;
 at least one heating element positioned for heating air that travels along the air flow path;
 at least one temperature sensor for sensing air temperature within the cabinet structure;
 a refrigeration system associated with the cabinet structure and including at least one blower and a corresponding air flow path associated with the thawing chamber;
 a controller connected to control the wall blower, the heating element and the refrigeration system, the controller receiving input from the temperature sensor, the controller operable such that:
  (i) if temperature indicated by the temperature sensor falls below a first set point, thawing operation is automatically initiated, during which the wall blower is operated and the heating element is repeatedly energized and de-energized based upon temperature indicated by the temperature sensor;
  (ii) if temperature indicated by the temperature sensor rises above a second set point, which is higher than the first set point, refrigeration operation is automatically initiated, during which the refrigeration system is repeatedly turned ON and OFF to maintain temperature of the thawing chamber within a refrigeration temperature range that is higher than the first set point.

29. The food thawing apparatus of claim 28 wherein the interior of the wall includes a common chamber that spans substantially a height of the wall.

30. The food thawing apparatus of claim 28 wherein the at least one blower includes multiple blowers associated with the common chamber.

31. The food thawing apparatus of claim 28 wherein, during thawing operation the refrigeration system is maintained in an OFF condition.

* * * * *

UNITED STATES PATENT AND TRADEMARK OFFICE
CERTIFICATE OF CORRECTION

| | | |
|---|---|---|
| PATENT NO. | : 7,119,306 B2 | Page 1 of 1 |
| APPLICATION NO. | : 10/752374 | |
| DATED | : October 10, 2006 | |
| INVENTOR(S) | : Walter J. Boryca et al. | |

It is certified that error appears in the above-identified patent and that said Letters Patent is hereby corrected as shown below:

Col. 8

Line 34, Change "pennitting" to -- permitting --.

Signed and Sealed this

Twenty-sixth Day of December, 2006

JON W. DUDAS
*Director of the United States Patent and Trademark Office*